US012044364B2

(12) United States Patent
Shao et al.

(10) Patent No.: US 12,044,364 B2
(45) Date of Patent: Jul. 23, 2024

(54) METHODS AND SYSTEMS FOR ASSESSING PIPELINE FAILURES BASED ON SMART GAS INTERNET OF THINGS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yong Li, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/454,779

(22) Filed: Aug. 23, 2023

(65) Prior Publication Data

US 2023/0392757 A1 Dec. 7, 2023

(30) Foreign Application Priority Data

Jul. 19, 2023 (CN) ......................... 202310884638.5

(51) Int. Cl.
*F17D 5/02* (2006.01)

(52) U.S. Cl.
CPC ..................................... *F17D 5/02* (2013.01)

(58) Field of Classification Search
CPC ......................................................... F17D 5/02
See application file for complete search history.

(56) References Cited

U.S. PATENT DOCUMENTS

2020/0309632 A1* 10/2020 Shao ...................... G01D 18/00
2023/0073685 A1 3/2023 Shao et al.
2023/0075722 A1 3/2023 Shao et al.
2023/0079768 A1 3/2023 Shao et al.
2023/0204166 A1* 6/2023 Madeira .................... F17D 5/02
73/40

FOREIGN PATENT DOCUMENTS

CN 111612301 A 9/2020
CN 113780237 A * 12/2021
CN 114429042 A 5/2022
CN 115356978 A 11/2022
(Continued)

OTHER PUBLICATIONS

Liu, Haiyun et al., Risk Analysis on Rupture Disaster Chain of Gas Pipeline Based on Complex Network, Journal of Safety Science and Technology, 16(9): 37-42, 2020.

*Primary Examiner* — Mohamed Charioui
*Assistant Examiner* — Xiuqin Sun
(74) *Attorney, Agent, or Firm* — METIS IP LLC

(57) ABSTRACT

The present disclosure provides methods and systems for assessing a pipeline failure based on a smart gas Internet of Things (IoT). The method is implemented by a smart gas safety management platform of an IoT system for smart gas pipeline network safety management, and the method includes obtaining at least one first failure risk in a gas pipeline and a downstream user feature, generating a plurality of candidate gas processing schemes based on the at least one first failure risk, and determining at least one second failure risk based on the at least one first failure risk and at least one of the candidate gas processing schemes.

3 Claims, 5 Drawing Sheets

(56) References Cited

FOREIGN PATENT DOCUMENTS

| | | | | |
|---|---|---|---|---|
| CN | 115358432 | A | | 11/2022 |
| CN | 115496625 | A | | 12/2022 |
| CN | 115545231 | A | | 12/2022 |
| CN | 115577744 | A | * | 1/2023 |
| CN | 115587640 | A | | 1/2023 |
| CN | 115631066 | A | | 1/2023 |
| CN | 115879913 | A | | 3/2023 |
| CN | 115965822 | A | * | 4/2023 |
| EP | 3557438 | A2 | | 10/2019 |
| WO | 2022251888 | A1 | | 12/2022 |

* cited by examiner

METHODS AND SYSTEMS FOR ASSESSING PIPELINE FAILURES BASED ON SMART GAS INTERNET OF THINGS

CROSS-REFERENCE TO RELATED APPLICATION

This application claims priority of Chinese Patent Application No. 202310884638.5, filed on Jul. 19, 2023, the contents of which are entirely incorporated herein by reference.

TECHNICAL FIELD

The present disclosure relates to the field of pipeline failure assessment, and in particular, to methods and systems for assessing a pipeline failure based on a smart gas Internet of Things.

BACKGROUND

A failure risk (e.g., leakage or damage) in a certain location of a gas pipeline may usually affect other normal pipelines with different degrees due to various factors such as leakage, failure, or valve closure for maintenance, which not only affects a pressure regulation effect of a gas gate station, but also affects a gas peak regulation capacity, thereby affecting experience of a gas user and leading to gas complaints.

Therefore, it is desirable to provide methods and systems for assessing a pipeline failure based on a smart gas Internet of Things, which may pre-determine adjustment strategies on gas when there is a failure risk in a certain location of the gas pipeline, so that the gas pipeline is processed in advance to reduce an impact of the pipeline failure on the normal pipelines.

SUMMARY

One or more embodiments of the present disclosure provide a method for assessing a pipeline failure based on a smart gas Internet of Things (IoT). The method is implemented by a smart gas safety management platform of an IoT system for smart gas pipeline network safety management, and the method includes: obtaining at least one first failure risk in a gas pipeline and a downstream user feature, wherein the at least one first failure risk is determined based on gas pipeline data, gas transmission data, and historical failure data of the gas pipeline; generating a plurality of candidate gas processing schemes based on the at least one first failure risk, wherein at least one of the candidate gas processing schemes at least includes a gas repair sub-scheme, and the gas repair sub-scheme includes a gas disconnection repair sub-scheme and a pressure reduction reinforcement repair sub-scheme; and determining at least one second failure risk based on the at least one first failure risk and the at least one of the candidate gas processing schemes, wherein the second failure risk is configured to assess a potential failure risk of the gas pipeline after being processed based on the at least one of the candidate gas processing scheme.

One or more embodiments of the present disclosure provide a system for assessing a pipeline failure based on a smart gas Internet of Things (IoT). The system includes a smart gas user platform, a smart gas service platform, a smart gas safety management platform, a smart gas pipeline network device sensing network platform, and a smart gas pipeline network device object platform; the smart gas user platform includes a plurality of smart gas user sub-platforms; the smart gas service platform includes a plurality of smart gas service sub-platforms; the smart gas safety management platform includes a plurality of smart gas pipeline network safety management sub-platforms and a smart gas data center; the smart gas network device sensing network platform is configured to interact with the smart gas data center and the smart gas network device object platform; the smart gas network device object platform is configured to obtain gas monitoring data based on a data obtaining instruction; the smart gas safety management platform is configured to obtain at least one first failure risk in a gas pipeline and a downstream user feature from the smart gas data center, wherein the at least one first failure risk is determined based on gas pipeline data, gas transmission data, and historical failure data of the gas pipeline; the smart gas safety management platform is configured to generate a plurality of candidate gas processing schemes based on the at least one first failure risk, wherein at least one of the candidate gas processing schemes at least includes a gas repair sub-scheme, and the gas repair sub-scheme includes a gas disconnection repair sub-scheme and a pressure reduction reinforcement repair sub-scheme; and the smart gas safety management platform is configured to determine at least one second failure risk based on the at least one first failure risk and the at least one of the candidate gas processing schemes, wherein the second failure risk is configured to assess a potential failure risk of the gas pipeline after being processed based on the at least one of the candidate gas processing scheme.

One or more embodiments of the present disclosure provide a non-transitory computer-readable storage medium. The storage medium stores computer instructions, and when a computer reads the computer instructions in the storage medium, the computer executes the method mentioned in any one of the embodiments mentioned above.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
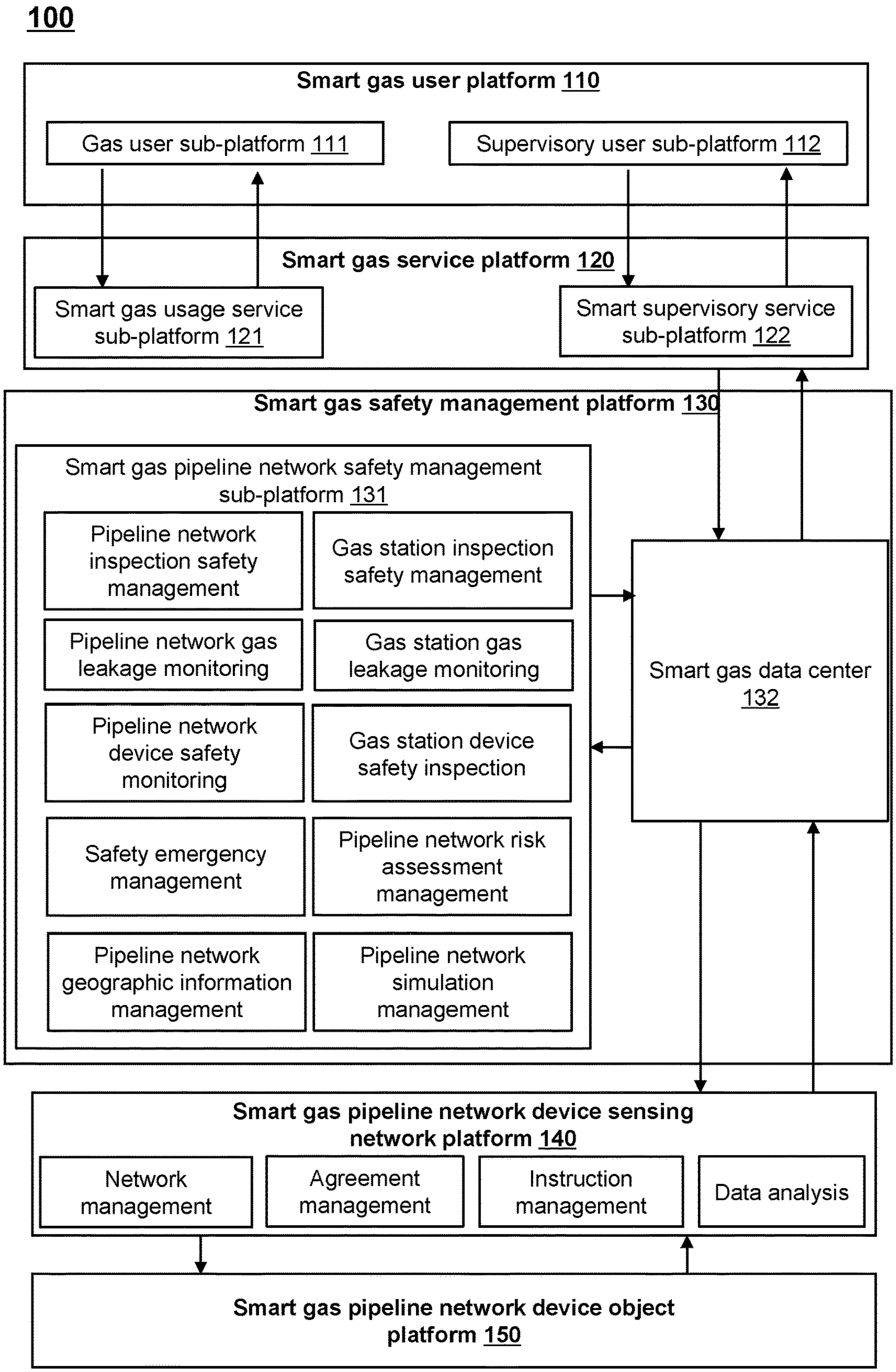
FIG. 1 is a diagram illustrating an exemplary structure of a system for assessing a pipeline failure according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise; the plural forms may be intended to include singular forms as well.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a diagram illustrating an exemplary structure of a system for assessing a pipeline failure according to some embodiments of the present disclosure. As shown in FIG. 1, the system for assessing the pipeline failure based on a smart gas Internet of Things (IoT) may include a smart gas user platform 110, a smart gas service platform 120, a smart gas safety management platform 130, a smart gas pipeline network device sensing network platform 140, and a smart gas pipeline network device object platform 150 that are connected in sequence.

The smart gas user platform 110 is a platform used to interact with a user. In some embodiments, the smart gas user platform 110 may be used as a terminal device.

In some embodiments, the smart gas user platform 110 may include a gas user sub-platform 111 and a supervisory user sub-platform 112.

The gas user sub-platform 111 is a platform that provides a gas user with data related to gas usage and solutions to gas problems.

The supervisory user sub-platform 112 is a platform for a supervisory user to supervise the operation of an IoT system.

The smart gas service platform 120 is used to send out users' requirements and control information.

In some embodiments, the smart gas service platform 120 may include a smart gas usage service sub-platform 121 and a smart supervisory service sub-platform 122.

The smart gas usage service sub-platform 121 is a platform for providing a gas usage service to the gas user.

The smart supervisory service sub-platform 122 is a platform for providing a supervisory requirement for the supervisory user.

The smart gas safety management platform 130 is a platform that coordinates or plans a connection and a collaboration between functional platforms as a whole, gathers information of the IoT, and provides functions such as perception management and control management for an operation system of the IoT.

In some embodiments, the smart gas safety management platform 130 may include a smart gas pipeline network safety management sub-platform 131 and a smart gas data center 132.

The smart gas pipeline network safety management sub-platform 131 may include but is not limited to, a pipeline network inspection safety management module, a gas station inspection safety management module, a pipeline network gas leakage monitoring module, a gas station leakage monitoring module, a pipeline network device safety monitoring module, a gas station device safety inspection module, a safety emergency management module, a pipeline network risk assessment management module, a pipeline network geographic information management module, and a pipeline network simulation management module.

The smart gas data center 132 may be used to store and manage operation information of an IoT system 100. In some embodiments, the smart gas data center may be configured as a storage device for storing data related to smart gas pipeline network device safety management, etc. For example, the smart gas data center 132 may store information such as a candidate gas processing scheme and a downstream user feature.

In some embodiments, the smart gas pipeline network safety management sub-platform 131 may interact with the smart gas service platform 120 and the smart gas pipeline network device sensing network platform 140 through the smart gas data center 132. Specifically, the smart gas pipeline network safety management sub-platform 131 may obtain and feedback pipeline network device safety management data from the smart gas data center 132. The smart gas data center 132 may aggregate and store operation data of the system.

In some embodiments, the smart gas safety management platform 130 may obtain at least one first failure risk in a gas pipeline and the downstream user feature from the smart gas data center, generate a plurality of candidate gas processing schemes based on the at least one first failure risk, and determine at least one second failure risk based on the at least one first failure risk and the candidate gas processing schemes.

In some embodiments, the smart gas safety management platform 130 may determine a target gas processing scheme based on the at least one first failure risk, the downstream user feature, and the at least one second failure risk.

In some embodiments, the smart gas safety management platform 130 may determine abnormal point distribution information based on gas transmission data, and determine the at least one first failure risk based on gas pipeline data, historical failure data, and abnormal point distribution information.

In some embodiments, the smart gas safety management platform 130 may determine the at least one first failure risk based on the gas pipeline data, the historical failure data, and the abnormal point distribution information through joint vector matching.

In some embodiments, the smart gas safety management platform 130 may determine a gas supply pressure variation distribution corresponding to the candidate gas processing scheme based on the at least one first failure risk and the candidate gas processing scheme, and determine the at least one second failure risk based on the gas supply pressure variation distribution.

In some embodiments, the smart gas safety management platform 130 may construct a first gas supply pressure feature graph, and determine the gas supply pressure variation distribution based on the first supply pressure feature graph through a gas supply pressure variation prediction model.

In some embodiments, the smart gas safety management platform 130 may construct a second gas supply pressure feature graph, and determine the at least one second failure risk based on the second gas supply pressure feature graph through a failure risk prediction model. More descriptions regarding the smart gas safety management platform 130 may be found in the relevant descriptions below.

The smart gas network device sensing network platform 140 may be a functional platform for managing sensing communication. In some embodiments, the smart gas pipeline network device sensing network platform 140 may be configured as a communication network and a gateway.

In some embodiments, the smart gas pipeline network device sensing network platform 140 may include network management, protocol management, instruction management, and data analysis.

The smart gas pipeline network device object platform 150 is a functional platform for generating perceptual information and executing control information. In some embodiments, the smart gas pipeline network device object platform 150 may be configured as a plurality of types of devices, including a pipeline network device (e.g., a gas compressor, a gas pipeline), a monitoring device (e.g., an inspection robot), etc.

In some embodiments of the present disclosure, based on the IoT system 100 for gas leakage monitoring, a closed loop of information operation may be formed between the smart gas pipeline network device object platform 150 and the smart gas user platform 110. The closed loop operates in a coordinated and regular manner under unified management of the smart gas safety management platform 130 to realize informatization and intellectualization of assessing and processing the gas pipeline failure.

Figure 2:
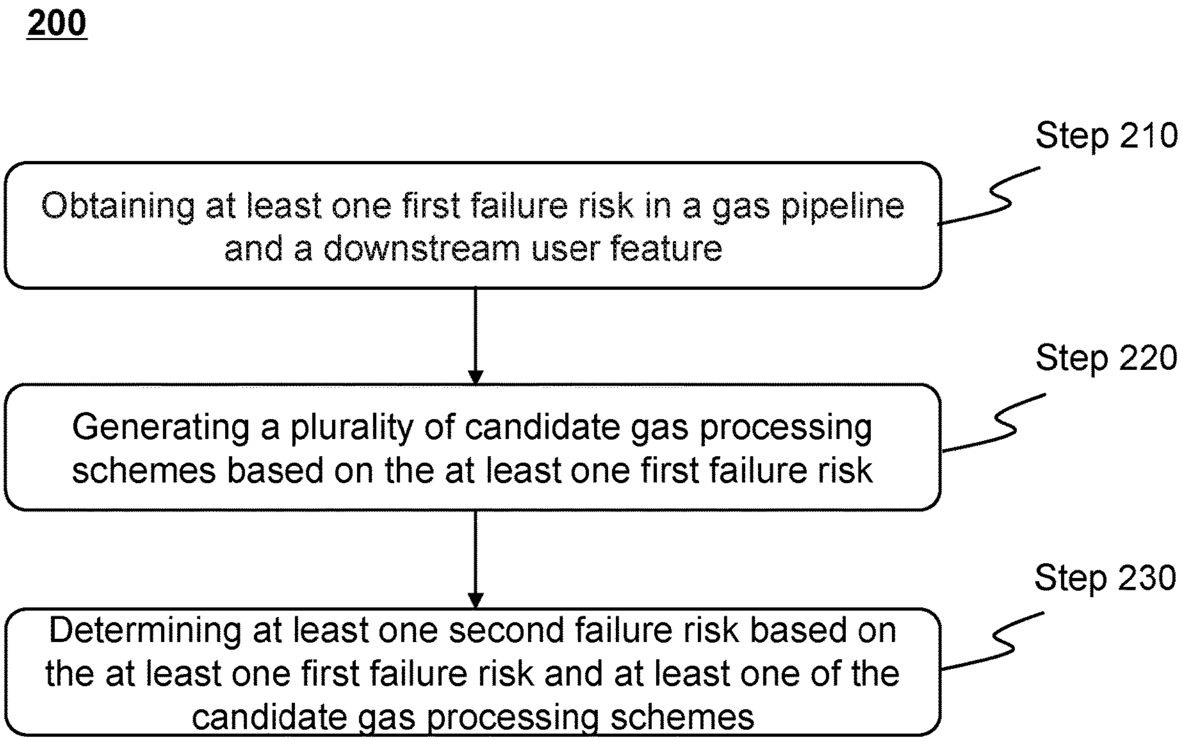
FIG. 2 is a flowchart illustrating an exemplary process of a method for assessing a pipeline failure according to some embodiments of the present disclosure.

FIG. 2 is a flowchart illustrating an exemplary process of a method for assessing a pipeline failure according to some embodiments of the present disclosure. As shown in FIG. 2, the process 200 includes the following operations. In some embodiments, the process 200 may be implemented on a smart gas safety management platform 130.

In 210, obtaining at least one first failure risk in a gas pipeline and a downstream user feature.

The first failure risk is used to indicate a failure risk in the gas pipeline. The first failure risk may include failure parameter data of the gas pipeline, and the failure parameter data may include a specific failure condition, etc.

In some embodiments, the smart gas safety management platform 130 may determine the first failure risk in a plurality of ways. For example, the smart gas safety management platform 130 may determine the first failure risk through vector matching based on gas pipeline data, gas transmission data, and historical failure data of the gas pipeline.

The gas pipeline data refers to data related to a gas transmission pipeline. For example, the gas pipeline data may include a pipeline diameter, a pipeline buried depth, a count of pipeline valves, and a pipeline location.

The gas transmission data refers to data related to gas transmission. For example, the gas transmission data may include a gas flow rate, a gas flow velocity, a gas pressure, etc.

The historical failure data refers to data of the gas pipeline when a failure occurred historically. For example, the historical failure data may include a count of failures, a failure type, a location of a historical failure, a failure severity, etc.

In some embodiments, the smart gas safety management platform 130 may determine abnormal point distribution information based on the gas transmission data. Further, the at least one first failure risk is determined based on the gas pipeline data, the historical failure data, and the abnormal point distribution information. In some embodiments, the at least one first failure risk may include a failure risk of each abnormal point.

The abnormal point refers to a transmission point in the gas pipeline where a failure occurs. The abnormal point distribution information refers to information related to a distribution of abnormal points, such as a location where an abnormal point is located.

In some embodiments, the smart gas safety management platform 130 may compare the gas transmission data with standard transmission data to determine the abnormal point distribution information. For example, when a deviation between the gas transmission data of a transmission point and the standard transmission data exceeds a threshold, the smart gas safety management platform 130 may determine that the transmission point has a failure and designate the transmission point as an abnormal point. There may be a plurality of transmission points in the gas pipeline that has a failure, and the abnormal point distribution may be determined based on locations of the plurality of abnormal points. In some embodiments, the threshold may be determined based on historical data or an expert opinion.

In some embodiments, the smart gas safety management platform 130 may determine the first failure risk through vector matching based on the gas pipeline data, the historical failure data, and the abnormal point distribution information.

In some embodiments, the smart gas safety management platform 130 may construct a vector to be matched by extracting a data feature based on gas pipeline data and historical failure data of a gas pipeline where one abnormal point is located. Further, the smart gas safety management platform 130 may designate a failure risk corresponding to a standard vector with a shortest distance as the first failure risk of the abnormal point by calculating a distance between the vector to be matched and a standard vector. The distance may be a cosine distance. The standard vector may be a vector constructed from a preset failure data feature or a vector obtained by statistically extracting a failure data feature from the historical failure data.

In some embodiments, the smart gas safety management platform 130 may determine the at least one first failure risk through joint vector matching based on the gas pipeline data, the historical failure data, and the abnormal point distribution information.

In some embodiments, the smart gas safety management platform 130 may construct the vector to be matched by extracting the data feature based on a (plurality of) abnormal point distribution(s), gas pipeline data of each abnormal point, a gas pipeline deviation threshold of each abnormal point, and historical failure data of each abnormal point. Further, the smart gas safety management platform 130 may designate a failure risk distribution corresponding to a standard vector with a shortest distance as the first failure risk of each abnormal point by calculating the distance between the vector to be matched and the standard vector. The gas pipeline deviation threshold refers to a threshold set based on a deviation between the gas transmission data of the transmission point and the standard transmission data. In some embodiments, the distance between the vector to be matched and the standard vector may be the cosine distance. The standard vector may be a vector constructed from failure data features of a plurality of preset abnormal points or a vector obtained by statistically extracting failure data features of the plurality of abnormal points from the historical failure data.

In some embodiments, the at least one first failure risk of the plurality of abnormal points may be determined more efficiently and accurately through joint vector matching.

The downstream user feature is a feature of a user who is supplied with gas through the gas pipeline. For example, the downstream user feature may include a user type, gas consumption, a distribution of gas usage times, etc.

In some embodiments, the smart gas safety management platform 130 may interact with the smart gas data center to obtain the downstream user feature stored by the smart gas data center.

In 220, generating a plurality of candidate gas processing schemes based on the at least one first failure risk.

The candidate gas processing scheme(s) refers to a gas adjustment scheme designated as a candidate scheme when there is a failure risk in the gas pipeline. For example, the candidate gas processing scheme may include one or more of shutting off a main valve, shutting off a portion of pipeline valves, modifying or reinforcing the pipeline, etc.

In some embodiments, the candidate gas processing scheme(s) may include a plurality of sub-schemes. For example, the candidate gas processing scheme(s) at least includes a gas repair sub-scheme, and the gas repair sub-scheme may include a gas disconnection repair sub-scheme and a pressure reduction reinforcement repair sub-scheme.

In some embodiments, the gas disconnection repair sub-scheme includes shutting off a valve and disconnecting gas for a specific pipeline, and the pressure reduction reinforcement repair sub-scheme includes depressurizing and/or reinforcing the specific pipeline. The specific pipeline refers to a pipeline that may have a failure and an upstream or a downstream of the pipeline that may have a failure.

In some embodiments, the smart gas safety management platform 130 may generate the candidate gas processing scheme(s) in a plurality of ways. For example, the smart gas safety management platform 130 may randomly generate a plurality of processing schemes as the candidate processing schemes.

In some embodiments, the smart gas safety management platform 130 may determine at least one failure type based on the at least one first failure risk, and determine the plurality of candidate gas processing schemes based on the at least one failure type and the downstream user feature.

The failure type refers to a type to which the failure data belongs, such as valve shut-off and gas disconnection repair, or pressure reduction reinforcement repair (gas connection repair). In some embodiments, in a process of gas disconnection repair, to determine the candidate gas processing schemes, an impact of a gas disconnection pipeline on other pipelines is required to be considered.

In some embodiments, the smart gas safety management platform 130 may construct a vector database based on a historical failure type and construct a feature retrieval vector based on the first failure risk. Further, the smart gas safety management platform 130 may input a reference vector with a highest matching similarity in the vector database and determine a failure type corresponding to the reference vector with the highest matching similarity as the failure type corresponding to the first failure risk.

In some embodiments, the smart gas safety management platform 130 may randomly generate processing schemes as the candidate gas processing schemes based on a plurality of processing schemes corresponding to the determined at least one failure type. In some embodiments, when a certain type of failure occurs, the smart gas safety management platform 130 may randomly generate processing schemes as the candidate gas processing schemes based on a plurality of schemes that have been taken accordingly when the type of failure occurs in the historical data.

In some embodiments, a probability of different processing schemes being generated may vary depending on the downstream user feature. For example, when a downstream user uses less gas at a current time, the candidate gas processing scheme that includes performing gas disconnection repair on the pipeline may have a higher probability of being generated.

In some embodiments, the smart gas safety management platform 130 may randomly generate the candidate gas processing schemes based on a preset random algorithm when determining the plurality of candidate gas processing schemes.

In some embodiments, a count of pipelines to be adjusted in the at least one of the candidate processing schemes is smaller than or equal to a first preset ratio. The count of pipelines to be adjusted (e.g., a count of pipelines for pressure or peak regulation) in the candidate gas processing schemes and an amount of adjustment of each pipeline (e.g., an amount of gas pressure distributed by a pipeline with a failure in each pipeline) may be determined through the first preset ratio. For example, if the first preset ratio is 20% and a gas pipeline network includes 30 pipelines, a count of pipelines adjusted in each candidate processing scheme may be no more than 6.

In some embodiments, the first preset ratio may be determined based on a gas pipeline network complexity, and the first preset ratio is equal to the product of k and gas pipeline network complexity, wherein k is determined manually.

In some embodiments, the gas pipeline network complexity is at least related to an out-degree and/or in-degree of a node feature of each node in a first gas supply pressure feature graph. For example, the gas pipeline network complexity is determined based on an equation of gas pipeline network complexity=(an in-degree of a pipeline 1+an in-degree of a pipeline 2+ . . . +an in-degree of a pipeline n+an out-degree of the pipeline 1+an out-degree of the pipeline 2+ . . . +an out-degree of the pipeline n)/2n, wherein n denotes the count of pipelines in the gas pipeline network. More descriptions regarding the first gas supply pressure feature graph may be found in FIG. 3 and related descriptions thereof.

In some embodiments, since a failure of gas disconnection in a pipeline leads to a plurality of gas pipelines being adjusted, the count of pipelines to be adjusted in the candidate gas processing scheme(s) is limited according to the first preset ratio, which prevents a relatively large uncertainty caused by excessive adjustment to the gas pipelines.

In some embodiments, the plurality of candidate gas processing schemes may be determined by the failure types and the downstream user feature, which may reduce an impact on gas usage of the downstream user while determining appropriate processing schemes.

In 230, determining at least one second failure risk based on the at least one first failure risk and the at least one of the candidate gas processing schemes.

The second failure risk is configured to assess a potential failure risk of a processed gas pipeline. For example, the second failure risk may include failure parameter data of the gas pipeline, and the failure parameter data may include a specific failure condition. In some embodiments, the second failure risk may be related to the candidate gas processing scheme, and the smart gas safety management platform 130 may evaluate the second failure risk corresponding to the gas pipeline after each candidate gas processing scheme is processed. For example, if a gas pipeline A needs to be shut down according to the candidate gas processing scheme, the second failure risk may be used to assess whether a pressure of a gas pipeline related to the gas pipeline A exceeds a pipeline bearing threshold after the gas pipeline is shut down, whether a failure may occur, etc.

In some embodiments, a determination of the second failure risk may be related to a type, a service life, etc. of a gas pipeline, or a time when a failure occurs. For example, when the failure occurs during a peak period of gas supply, and if the gas pipeline A needs to be shut down according to the candidate gas processing scheme, a risk where a failure occurs to a gas pipeline B and a gas pipeline C is relatively large, and the second failure risk may be determined.

In some embodiments, the smart gas safety management platform 130 may determine a gas supply pressure variation distribution corresponding to the at least one of the candidate gas processing schemes based on the at least one first failure risk and the at least one of the candidate gas processing schemes, and determine the at least one second failure risk based on the gas supply pressure variation distribution.

The gas supply pressure variation distribution refers to a distribution of pressure variations of the gas pipelines before and after processing based on the candidate gas processing scheme(s).

In some embodiments, the gas supply pressure variation distribution may be related to the candidate gas processing scheme(s), a count of gas pipelines, etc. In some embodiments, the gas supply pressure variation distribution may be determined based on the candidate gas processing scheme(s). For example, a corresponding process is performed on the gas pipeline according to the candidate gas processing scheme(s), and a gas supply pressure variation distribution of the gas pipeline after the processing is performed on the gas pipeline in a historical situation is designated as a gas supply pressure variation distribution after the processing of the candidate gas processing scheme(s).

In some embodiments, the smart gas safety management platform 130 may calculate a pressure variation of the gas pipeline based on the candidate gas processing scheme(s). For example, two pipelines B and C are parallel to the gas pipeline A. When the gas processing scheme indicates that gas disconnection processing is required to be performed on the gas pipeline A, the pipeline B and the pipeline C may share a supply pressure of the pipeline A equally. Further, after the pipeline B and the pipeline C equally share the gas supply pressure of the pipeline A, the second failure risk may be determined. That is, whether a pressure of the pipeline B or a pressure of the pipeline C exceeds the pipeline bearing threshold may be determined, and the failure occurs if the pipeline bearing threshold is exceeded.

In some embodiments, the smart gas safety management platform 130 may construct a first gas supply pressure feature graph. The first gas supply pressure feature graph includes a first node and a first edge, the first node includes a connection position of pipelines, and the first edge includes a pipeline. The smart gas safety management platform 130 may determine the gas supply pressure variation distribution through a gas supply pressure variation prediction model based on the first gas supply pressure feature graph.

The first gas supply pressure feature graph is a feature graph used to reflect a gas pipeline direction, a connection, and an internal pressure. In some embodiments, the first edge may represent a pipeline connecting pipeline nodes, and the first edge may be a directed edge. A direction of the directed edge may reflect a direction of gas flow. An edge feature of the first edge may include a gas supply pressure, a pipeline service life, historical failure data, an operating feature, etc. The first node may represent a pipeline node, i.e., a connection point or an inflection point of two or more sections of pipelines. A node feature of the first node may include a gas supply pressure, historical failure data, an operating feature, etc. In some embodiments, the operating feature may be whether the gas pipeline or pipeline node is disconnected, reinforced, or depressurized in the candidate gas processing scheme(s). For example, if there is no gas passing through the gas pipeline or pipeline node, the gas pipeline or pipeline node may be considered to be disconnected.

Figure 3:
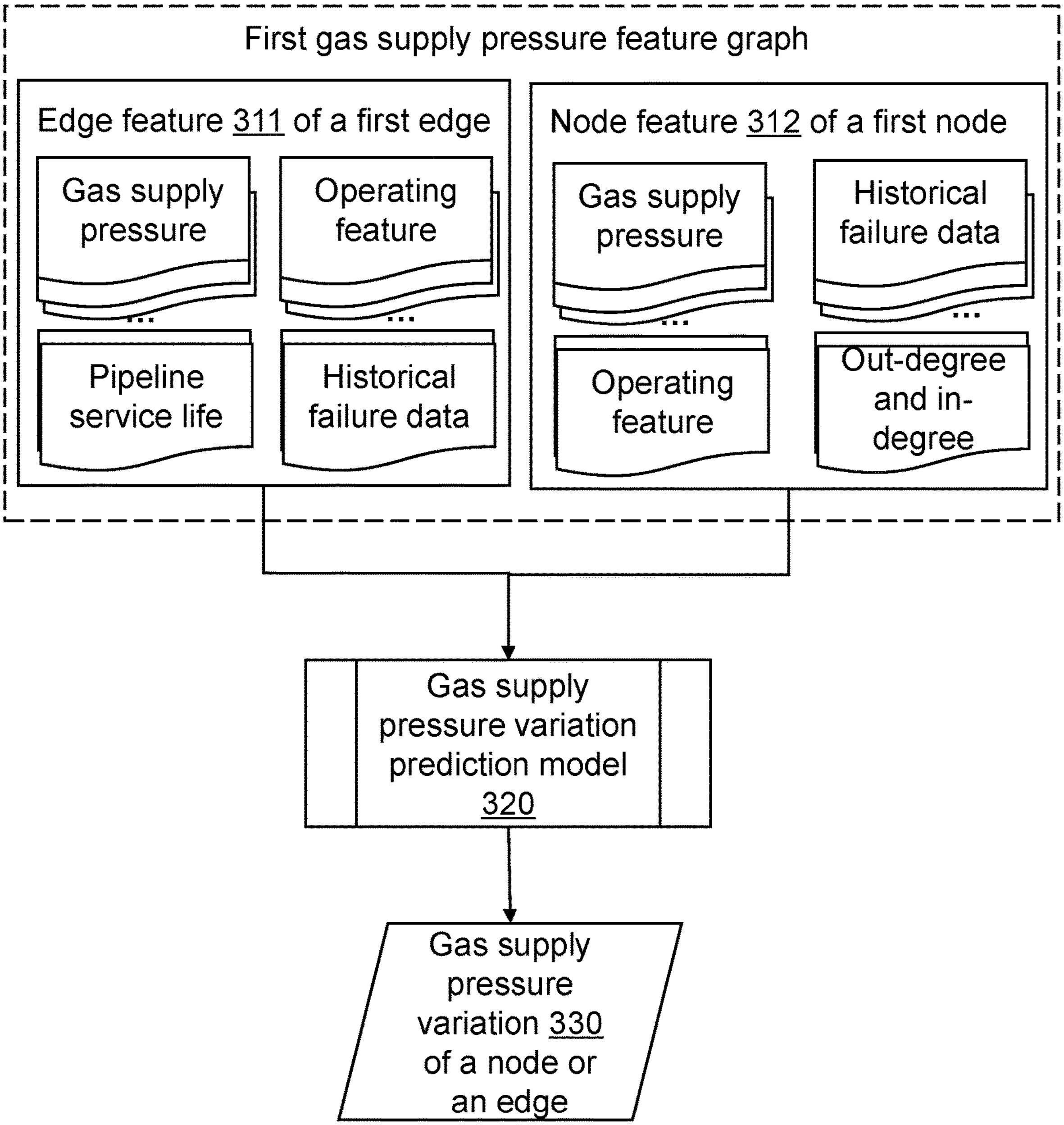
FIG. 3 is a diagram illustrating a gas supply pressure variation prediction model according to some embodiments of the present disclosure.

FIG. 3 is a diagram illustrating a gas supply pressure variation prediction model according to some embodiments of the present disclosure.

In some embodiments, the gas supply pressure variation prediction model may be a machine learning model. For example, the gas supply pressure variation prediction model may be a graph neural network (GNN) model, other neural networks, or any combination thereof.

In some embodiments, as shown in FIG. 3, an input of the gas supply pressure variation prediction model 320 may include a first gas supply pressure feature graph 310 (including an edge feature 311 of a first edge and a node feature 312 of a first node). An output of the gas supply pressure variation prediction model 320 may include a gas supply pressure variation 330 of a node or an edge.

In some embodiments, a gas supply pressure variation distribution may be formed based on the gas supply pressure variation of each node or edge.

In some embodiments, the gas supply pressure variation prediction model may be obtained by training a plurality of first training samples with first labels. In some embodiments, the first training sample(s) may include a historical first gas supply pressure feature graph. The first label(s) may include a gas supply pressure variation of a node or an edge corresponding to the historical first gas supply pressure feature graph when a sample processing scheme is adapted. In some embodiments, the first training sample(s) may be obtained based on historical data. The first label(s) may be marked manually.

In some embodiments, the gas supply pressure variation of the node or the edge may be predicted using a gas supply pressure variation prediction model, so that an obtained gas supply pressure variation of the node or the edge and the gas supply pressure variation distribution is more accurate, thereby realizing more accurate and efficient identification of a potential failure risk of the gas pipeline.

In some embodiments, the nodal feature of the first node of the first supply pressure feature graph may include an out-degree and an in-degree.

In some embodiments, the out-degree may indicate a count of pipeline branches that flow out of the node of the pipeline, and the in-degree may indicate a count of pipeline branches that flow in from the node of the pipeline. For example, a node 1 connects five sections of gas pipelines A, B, C, D, and E. Gas from gas pipelines A and B flows through the node 1 to gas pipelines C, D, and E, thus, the in-degree is 2 (corresponding to gas pipelines A and B) and the out-degree is 3 (corresponding to gas pipelines C, D, and E).

In some embodiments, by setting the first gas supply pressure feature graph, the out-degree, and the in-degree, a feature of the gas pipeline may be displayed more accurately and efficiently, which is conducive to the machine learning model learning a correlation between the in-degree, the out-degree, and the gas supply pressure variation, subsequently, so that an output gas supply pressure variation distribution is more accurate.

In some embodiments, the smart gas safety management platform 130 may determine a second failure risk based on the predicted gas supply pressure variation distribution according to experience or a preset algorithm. In some embodiments, the second failure risk may also be determined based on a machine learning model.

In some embodiments, the smart gas safety management platform 130 may construct a second gas supply pressure feature graph. The second gas supply pressure feature graph includes a second node and a second edge, the second node includes a connection position of pipelines, and the second edge includes a pipeline. The smart gas safety management platform 130 may determine the at least one second failure risk based on the second gas supply pressure feature graph through a failure risk prediction model.

The second gas supply pressure feature graph is used to reflect a gas pipeline direction, a connection, and an internal pressure of a pipeline after being processed by the candidate gas processing scheme(s). In some embodiments, the second edge may represent a pipeline connecting pipeline nodes, and the second edge may be a directed edge. A direction of the directed edge may reflect a direction of gas flow. An edge feature of the second edge may include a gas supply pressure, a pipeline service life, historical failure data, a gas supply pressure variation, a failure risk, a downstream gas supply feature, etc. The gas supply pressure variation refers to an increased pressure or a decreased pressure, and the gas supply pressure variation may be determined based on the gas supply pressure variation prediction model. Descriptions regarding the gas supply pressure variation prediction model may be found in the descriptions above.

In some embodiments, the second node may represent a pipeline node, i.e., a connection point or an inflection point of two or more sections of the pipelines. A node feature of the second node may include an out-degree and an in-degree, a failure risk, and a downstream gas supply feature, etc.

The downstream gas supply feature refers to a gas supply feature of a second edge having a downstream or a gas supply feature of a second node having a downstream. The second edge has a downstream or the second node has a downstream means that gas in the pipeline (the second edge) or the node of the pipeline (the second node) is able to flow to other pipelines or pipeline nodes. The other pipelines or pipeline nodes are the downstream of the pipeline (the second edge) or the downstream of the pipeline node (the second node). The gas supply feature is a feature related to a gas supply situation. For example, the gas supply feature may include whether gas is supplied (i.e., whether the gas flows through the pipeline or the pipeline node), a flow rate of the gas supply, etc. If the second edge or second node has no downstream, the downstream gas supply feature may be represented as 0.

Figure 4:
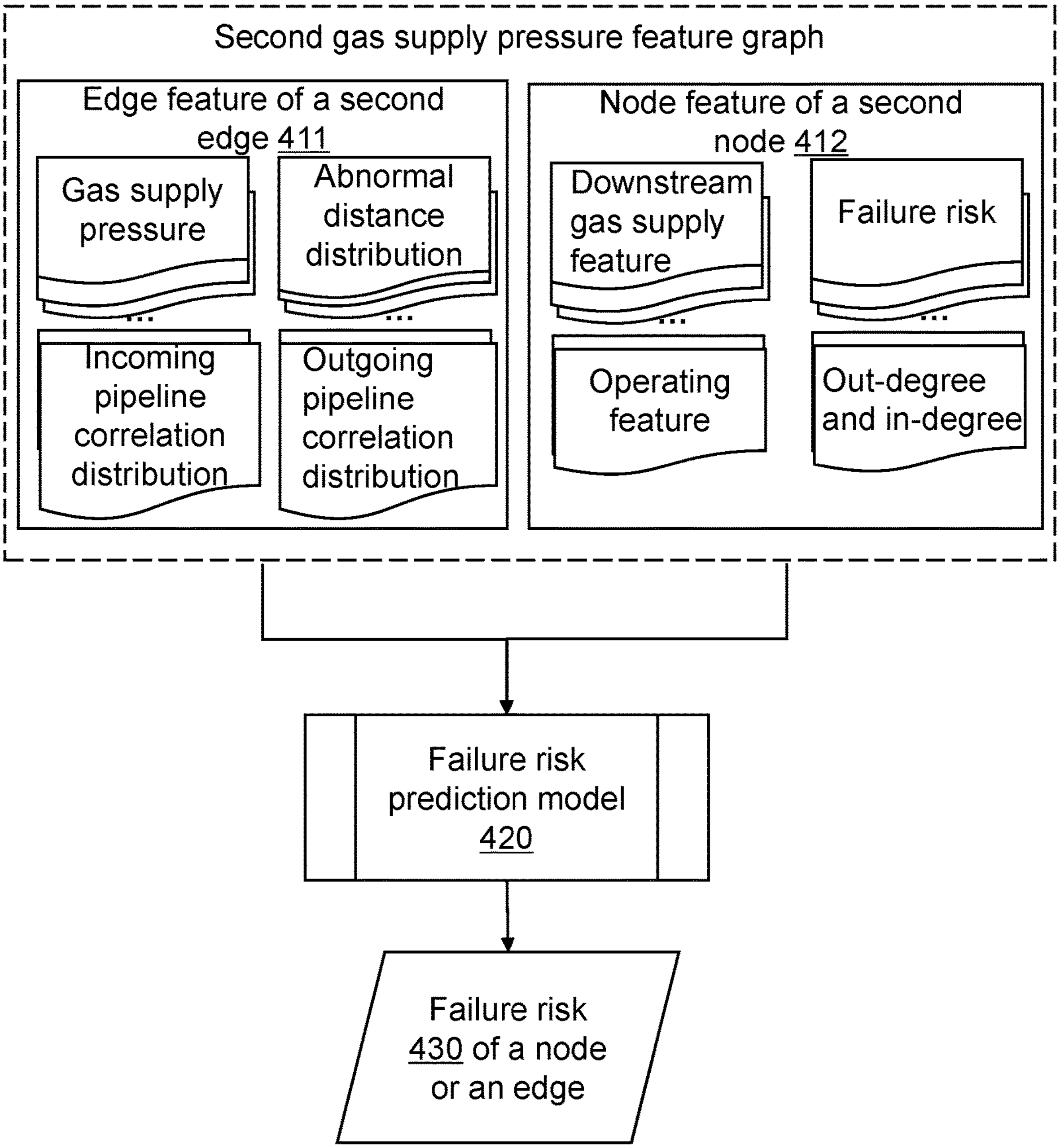
FIG. 4 is a diagram illustrating a failure risk prediction model according to some embodiments of the present disclosure.

FIG. 4 is a diagram illustrating a failure risk prediction model according to some embodiments of the present disclosure.

In some embodiments, the failure risk prediction model may be a machine learning model. For example, the failure risk prediction model may be a graph neural network (GNN) model, other neural networks, or the like, or any combination thereof.

In some embodiments, as shown in FIG. 4, an input of the failure risk prediction model 420 may include a second gas supply pressure feature graph 410 (including an edge feature 411 of a second edge, a node feature 412 of a second node, etc.). An output of the failure risk prediction model 420 may include a failure risk 430 of a node or an edge. In some embodiments, a second failure risk may be generated based on the failure risk 430.

In some embodiments, the failure risk prediction model may be obtained by training a plurality of second training samples with second labels. In some embodiments, the second training sample(s) may include a historical second gas supply pressure feature graph. The second label(s) may include whether a node or an edge corresponding to the historical second gas supply pressure feature graph has a failure when a sample processing scheme is adapted and a pipeline parameter of a gas pipeline where the failure occurred. In some embodiments, the second training sample(s) may be obtained based on historical data. The second label(s) may be marked manually.

In some embodiments, the failure risk of the node or the edge may be predicted using the failure risk prediction model, so that an obtained failure risk of the node or the edge is more accurate, thereby obtaining a more accurate second failure risk to correspondingly develop a more accurate and efficient gas processing scheme.

In some embodiments, an edge feature of the second edge of the second supply pressure feature graph further includes an incoming pipeline correlation distribution and an outgoing pipeline correlation distribution. An incoming pipeline correlation is determined by a failure correlation between each incoming pipeline and a current node, and the outgoing pipeline correlation is determined by the failure correlation between each outgoing pipeline and the current node.

In some embodiments, the incoming pipeline correlation distribution and the outgoing pipeline correlation distribution may reflect a distribution of a failure correlation between an edge incoming from the current node and an edge wherein the current node is located, and a distribution of a failure correlation between an edge outcoming from the current node and an edge wherein the current node is located, respectively. The failure correlation reflects an intrinsic correlation between two pipelines.

Figure 5A:
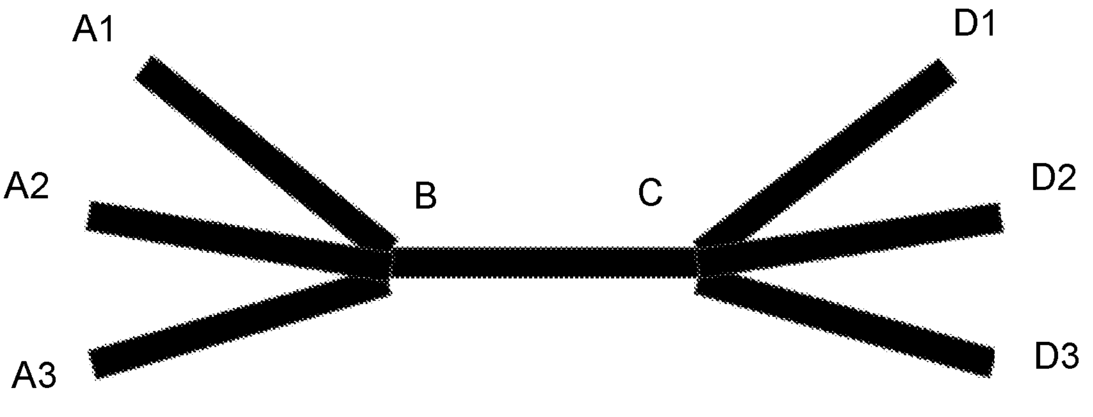
FIG. 5A is a schematic diagram illustrating a pipeline distribution according to some embodiments of the present disclosure.

FIG. 5A is a schematic diagram illustrating a pipeline distribution according to some embodiments of the present disclosure.

For example, as shown in FIG. 5A, an incoming pipeline correlation distribution in an edge feature of BC may be expressed as follows: a failure correlation between a pipeline A1B and a pipeline BC, a failure correlation between a pipeline A2B and the pipeline BC, and a failure correlation between a pipeline A3B and the pipeline BC. An outgoing pipeline correlation distribution in the edge feature of BC may be expressed as follows: a failure correlation between a pipeline CD1 and the pipeline BC, a failure correlation between a pipeline CD2 and the pipeline BC, and a failure correlation between a pipeline CD3 and the pipeline BC.

In some embodiments, the failure correlation is positively correlated with a frequency where failures occur in two pipelines simultaneously. The frequency where failures occur in two pipelines simultaneously may be obtained by statistics or by other means according to historical data, which may not be limited herein.

In some embodiments, by inputting the incoming/outgoing pipeline correlation distribution into a failure risk prediction model, an intrinsic correlation between pipelines may be more accurately determined, thereby improving accuracy in determining a failure risk.

In some embodiments, the edge feature of the second edge of the second gas supply pressure feature graph further includes an abnormal distance distribution. The abnormal distance distribution includes a distance between a location of a pipeline corresponding to the second edge and a location of an abnormal point in abnormal point distribution information. More descriptions regarding the abnormal point may be found in FIG. 2 and related descriptions thereof.

In some embodiments, the distance refers to a count of gas pipelines that are passed through in a direction of a gas flow route. The abnormal distance distribution may reflect an intrinsic correlation between a distance of an abnormal point(s) and a potential failure risk.

Figure 5B:
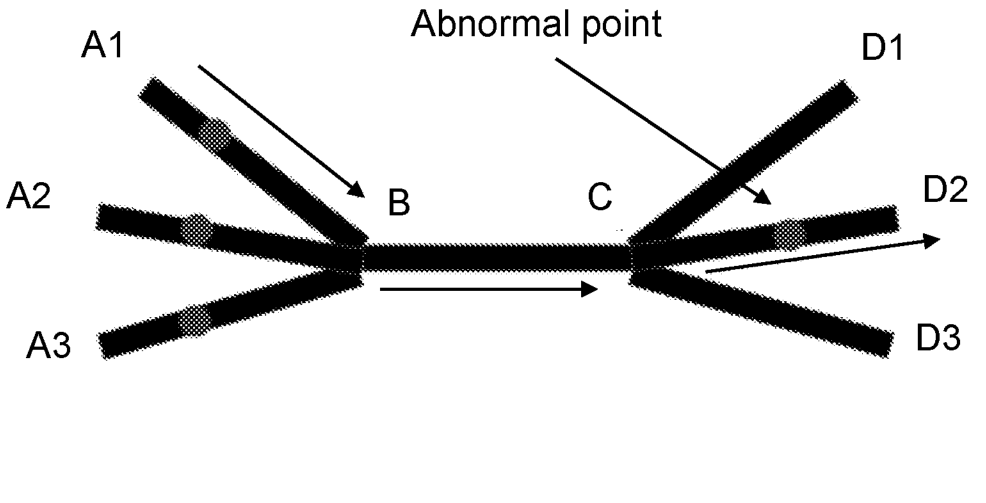
FIG. 5B is a schematic diagram illustrating a pipeline distribution according to some embodiments of the present disclosure.

FIG. 5B is a schematic diagram illustrating a pipeline distribution according to some embodiments of the present disclosure.

For example, as shown in FIG. 5B, taking an edge feature of CD2 as an example, an abnormal distance distribution of CD2 may be expressed as (0, 2, 2, 2). A first element denotes an abnormal point of a current edge CD2, and an abnormal distance of the abnormal point is 0. A second element denotes a distance between the abnormal point of the current edge CD2 and an abnormal point of an edge A1B. Since abnormal points are separated by a pipeline A1B and a pipeline BC, if a distance of each pipeline is considered to be 1, the abnormal distance between the abnormal point of the current edge CD2 and the abnormal point of the edge A1B is 2. A third element denotes a distance between the abnormal point of the current edge CD2 and an abnormal point of an edge A2B. Since the abnormal points are separated by a pipeline A2B and the pipeline BC, the abnormal distance between the abnormal point of the current edge CD2 and the abnormal point of the edge A2B is 2. A fourth element denotes a distance between the abnormal point of the current edge CD2 and an abnormal point of an edge A3B. Since the abnormal points are separated by a pipeline A3B and the pipeline BC, the abnormal distance between the abnormal point of the current edge CD2 and the abnormal point of the edge A3B is 2.

In some embodiments, by inputting the abnormal distance distribution into the failure risk prediction model, an intrinsic correlation between a distance of an abnormal point(s) and a potential failure risk may be analyzed, thus improving accuracy in determining a failure risk.

In some embodiments, the smart gas safety management platform 130 may also determine a target gas processing scheme based on at least one first failure risk, a downstream user feature, and at least one second failure risk.

The target gas processing scheme is a scheme that a targeted processing may be performed on a gas pipeline where a failure occurs. The target gas processing scheme may include a gas repair sub-scheme, such as a gas disconnection repair sub-scheme, a pressure reduction reinforcement repair sub-scheme, etc.

In some embodiments, based on the first failure risk, i.e., failure parameter data of the gas pipeline, whether a gas disconnection repair is needed may be determined. For example, based on the failure parameter data of the gas pipeline, it is possible to determine empirically whether the gas disconnection repair is needed. If the gas disconnection repair is needed according to the first failure risk, the target gas processing scheme is jointly determined based on the downstream user feature and the second failure risk.

In some embodiments, a pressure regulation scheme or a peak regulation scheme may be selected manually based on the downstream user feature. The pressure regulation scheme refers to a scheme that other gas pipelines are adjusted to help the gas pipeline with the failure to supply gas. For example, a gas pipeline B of a relatively less important user is adjusted to be a gas pipeline that helps a gas pipeline A of a relatively more important user with a failure to supply gas. In some embodiments, the pressure regulation may be implemented based on an upstream gas gate station.

The peak regulation scheme is used to distribute gas needed to be output from the gas pipeline with the failure to other gas pipelines that work normally for supplying gas. In some embodiments, a storage tank may be used for temporary gas storage and degassing when the gas pipeline with the failure is shut down.

In some embodiments, a gas candidate processing scheme with a relatively small second failure risk may be selected as the target gas processing scheme if it is determined that the gas disconnection repair is not needed based on the first failure risk. A pressure bearing capacity of the gas pipeline is needed to be considered in selecting the target gas processing scheme to avoid a potential failure. That is, the second failure risk may not occur. In some embodiments, when the second failure risk is output based on the failure risk prediction model, a risk probability corresponding to the second failure risk may also be output at the same time. The risk probability refers to a possibility where a failure risk occurs. The higher the risk probability, the higher the possibility where the failure occurs. A candidate gas processing scheme corresponding to the second failure risk with a risk probability smaller than a preset threshold is selected as the target gas processing scheme, which may effectively control the potential failure risk.

In some embodiments, if there are two types of candidate gas processing schemes including a scheme that needs the gas disconnection and a scheme that does not need the gas disconnection, and it is indicated that the failure can be handled using the scheme that does not need the gas disconnection, the scheme that does not need the gas disconnection may be used in preference to the scheme that needs the gas disconnection. In such a case, the scheme with the relatively small second failure risk may be determined as the target gas processing scheme. If there is only one scheme that needs the gas disconnection, the downstream user feature needs to be considered, and the failure may be handled either through the peak regulation scheme or the pressure regulation scheme.

In some embodiments, since the candidate gas processing scheme(s) is a processing scheme generated based on a failure problem of the pipeline without taking into account a downstream user, the downstream user needs to be considered while selecting a final scheme.

Merely by way of example, the downstream commercial user has a fixed high demand for gas between 4:00 pm and 5:00 pm. If there is a problem with the gas at 3:00 pm, it takes half an hour for gas disconnection repair, and the candidate gas processing scheme(s) includes various schemes for calling the pipeline to regulate the pressure. However, according to a situation of the downstream user, if the downstream user uses very little gas at 3:00 pm, the gas storage tank may be directly used to temporarily release the gas or send a gas shutdown notice. In this case, the second failure risk of the various pressure regulation schemes in the candidate gas processing scheme(s) is invalid. If there is a problem with the gas that needs to be repaired at 4 pm, the gas processing scheme may be determined based on the second failure risk.

In some embodiments, the target gas processing scheme may be jointly determined through the first failure risk, the downstream user feature, and the second failure risk, which can determine an effective target gas processing scheme accurately.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for assessing a pipeline failure based on a smart gas Internet of Things (IoT), wherein the method is implemented by a smart gas safety management platform of an IoT system for smart gas pipeline network safety management, the method comprises:

obtaining at least one first failure risk in a gas pipeline and a downstream user feature, wherein the downstream user feature is obtained based on an interaction between the smart gas safety management platform and a smart gas data center, wherein the at least one first failure risk is determined based on gas pipeline data, gas transmission data, and historical failure data of the gas pipeline, wherein the determining the at least one first failure risk based on gas pipeline data, gas transmission data, and historical failure data of the gas pipeline comprises:

determining abnormal point distribution information based on the gas transmission data; and determining the at least one first failure risk based on the gas pipeline data, the historical failure data, and the abnormal point distribution information, wherein the at least one first failure risk includes a failure risk of each abnormal point;

generating a plurality of candidate gas processing schemes based on the at least one first failure risk, wherein at least one of the candidate gas processing schemes at least includes a gas repair sub-scheme, and the gas repair sub-scheme includes a gas disconnection repair sub-scheme and a pressure reduction reinforcement repair sub-scheme; and determining at least one second failure risk based on the at least one first failure risk and the at least one of the candidate gas processing schemes, wherein the determining at least one second failure risk based on the at least one first failure risk and the at least one of the candidate gas processing schemes comprises:

determining a gas supply pressure variation distribution corresponding to the at least one of the candidate gas processing schemes based on the at least one first failure risk and the at least one of the candidate gas processing schemes; and determining the at least one second failure risk based on the gas supply pressure variation distribution, wherein the determining a gas supply pressure variation distribution corresponding to the at least one of the candidate gas processing schemes based on the at least one first failure risk and the at least one of the candidate gas processing schemes comprises:

constructing a first gas supply pressure feature graph, wherein the first gas supply pressure feature graph includes a first node and a first edge, the first node includes a connection position of pipelines, and the first edge includes a pipeline; and determining the gas supply pressure variation distribution through a gas supply pressure variation prediction model based on the first gas supply pressure feature graph, wherein the gas supply pressure variation prediction model is a machine learning model, and the gas supply pressure variation prediction model is obtained through training by the smart gas safety management platform based on a plurality of first training samples with first labels, wherein the first training samples include a historical first gas supply pressure feature graph, the first labels include a gas supply pressure variation of a node or an edge corresponding to the historical first gas supply pressure feature graph, wherein the second failure risk is configured to assess a potential failure risk of the gas pipeline after being processed based on the at least one of the candidate gas processing schemes; and the method further comprises:

determining a target gas processing scheme based on the at least one first failure risk, the downstream user feature, and the at least one second failure risk, wherein the target gas processing scheme includes the gas repair sub-scheme.

2. The method of claim 1, wherein the determining the at least one second failure risk based on the gas supply pressure variation distribution comprises:

constructing a second gas supply pressure feature graph, wherein the second gas supply pressure feature graph includes a second node and a second edge, the second node includes a connection position of pipelines, and the second edge includes a pipeline; and determining the at least one second failure risk through a failure risk prediction model based on the second gas supply pressure feature graph, wherein the failure risk prediction model is a machine learning model.

3. A system for assessing a pipeline failure based on a smart gas Internet of Things (IoT), wherein the system comprises a smart gas user platform, a smart gas service platform, a smart gas safety management platform, a smart gas pipeline network device sensing network platform, and a smart gas pipeline network device object platform;

the smart gas user platform includes a plurality of smart gas user sub-platforms;

the smart gas service platform includes a plurality of smart gas service sub-platforms;

the smart gas safety management platform includes a plurality of smart gas pipeline network safety management sub-platforms and a smart gas data center;

the smart gas network device sensing network platform is configured to interact with the smart gas data center and the smart gas network device object platform;

the smart gas network device object platform is configured to obtain gas monitoring data based on a data obtaining instruction;

the smart gas safety management platform is configured to obtain at least one first failure risk in a gas pipeline and a downstream user feature from the smart gas data center, wherein the downstream user feature is obtained based on an interaction between the smart gas safety management platform and the smart gas data center, wherein the at least one first failure risk is determined based on gas pipeline data, gas transmission data, and historical failure data of the gas pipeline, wherein the at least one first failure risk being determined based on gas pipeline data, gas transmission data, and historical failure data of the gas pipeline comprises:

determining abnormal point distribution information based on the gas transmission data; and determining the at least one first failure risk based on the gas pipeline data, the historical failure data, and the abnormal point distribution information, wherein the at least one first failure risk includes a failure risk of each abnormal point;

the smart gas safety management platform is configured to generate a plurality of candidate gas processing schemes based on the at least one first failure risk, wherein at least one of the candidate gas processing schemes at least includes a gas repair sub-scheme, and the gas repair sub-scheme includes a gas disconnection repair sub-scheme and a pressure reduction reinforcement repair sub-scheme;

the smart gas safety management platform is configured to determine at least one second failure risk based on the at least one first failure risk and the at least one of the candidate gas processing schemes, wherein the at least one second failure risk being determined based on the at least one first failure risk and the at least one of the candidate gas processing schemes comprises:

determining a gas supply pressure variation distribution corresponding to the at least one of the candidate gas processing schemes based on the at least one first failure risk and the at least one of the candidate gas processing schemes by a management platform; and determining the at least one second failure risk based on the gas supply pressure variation distribution, wherein the determining a gas supply pressure variation distribution corresponding to the at least one of the candidate gas processing schemes based on the at least one first failure risk and the at least one of the candidate gas processing schemes comprises:

constructing a first gas supply pressure feature graph, wherein the first gas supply pressure feature graph includes a first node and a first edge, the first node includes a connection position of pipelines, and the first edge includes a pipeline; and determining the gas supply pressure variation distribution through a gas supply pressure variation prediction model based on the first gas supply pressure feature graph, wherein the gas supply pressure variation prediction model is a machine learning model, and the gas supply pressure variation prediction model is obtained through training by the smart gas safety management platform based on a plurality of first training samples with first labels, wherein the first training samples include a historical first gas supply pressure feature graph, the first labels include a gas supply pressure variation of a node or an edge corresponding to the historical first gas supply pressure feature graph, wherein the second failure risk is configured to assess a potential failure risk of the gas pipeline after being processed based on the at least one of the candidate gas processing scheme; and the smart gas safety management platform is configured to determine a target gas processing scheme based on the at least one first failure risk, the downstream user feature, and the at least one second failure risk, wherein the target gas processing scheme includes the gas repair sub-scheme.

* * * * *